(No Model.) 2 Sheets—Sheet 1.
J. H. BAKER.
MANUFACTURE OF LINKS AND APPARATUS THEREFOR.

No. 451,797. Patented May 5, 1891.

WITNESSES

INVENTOR (No Model.) 2 Sheets—Sheet 2.
J. H. BAKER.
MANUFACTURE OF LINKS AND APPARATUS THEREFOR.
No. 451,797. Patented May 5, 1891.
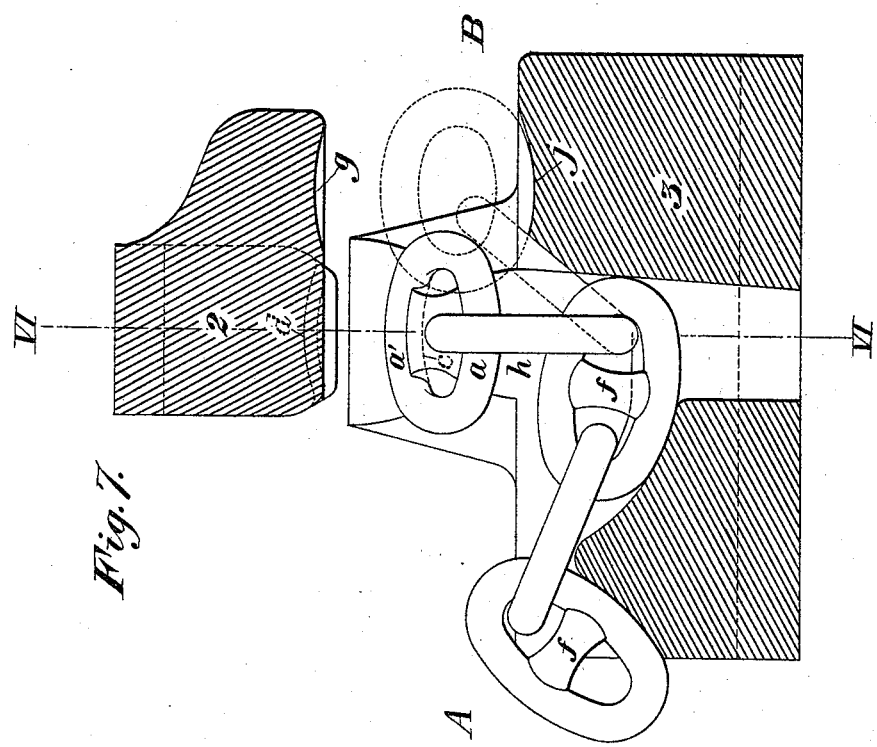
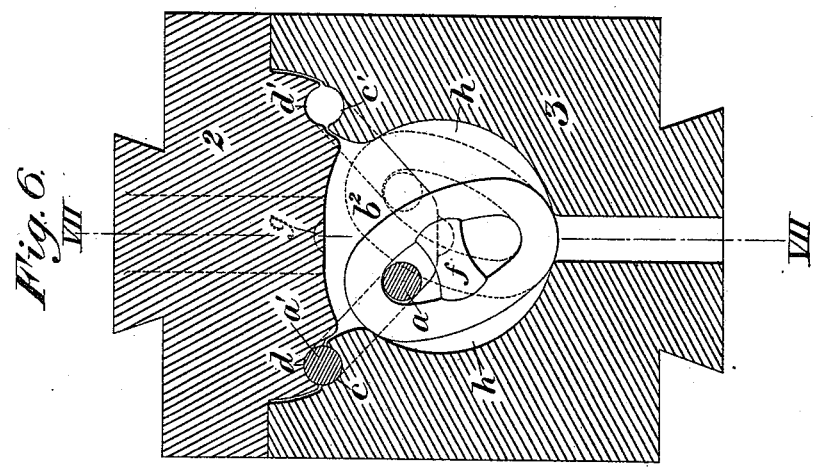
WITNESSES
INVENTOR

UNITED STATES PATENT OFFICE.

JAMES H. BAKER, OF ALLEGHENY, PENNSYLVANIA, ASSIGNOR TO THE BAKER CHAIN AND WAGON IRON MANUFACTURING COMPANY, OF SAME PLACE.

MANUFACTURE OF LINKS AND APPARATUS THEREFOR.

SPECIFICATION forming part of Letters Patent No. 451,797, dated May 5, 1891.

Application filed August 2, 1890. Serial No. 360,729. (No model.)

*To all whom it may concern:*

Be it known that I, JAMES H. BAKER, of Allegheny, in the county of Allegheny and State of Pennsylvania, have invented a new and useful Improvement in the Manufacture of Links and Apparatus Therefor, of which the following is a full, clear, and exact description.

Heretofore in the manufacture of chain-links it has been the common practice to employ a pair of dies of which the bottom die is provided with a face having a U-shaped groove adapted to receive the end portion of the link to be welded, and the moving die is in form a substantial counterpart of the other, and is constructed and arranged to strike upon the link. Each link is welded separately, an open or unwelded link being heated, threaded in the link last welded, then placed on the bottom die and welded, and after each stroke of the hammer it is necessary to turn the link over on the die, so that the reverse side of its end portion shall rest horizontally in the groove before mentioned, and so that both sides shall be subjected alternately to the stroke of the moving die. As the dies are so constructed that one end is closed, the end next to the workman at which the links are introduced being open, the part of the chain already formed is drawn out toward the workman, and in order to turn the link it is necessary also to turn with it a considerable part of the welded chain. The heat of the chain and its weight often make this work arduous, consume considerable time, and consequently add materially to the cost of manufacture. There are other objections to the use of such dies which affect the quality and strength of the chain-links. Of these the principal are that they provide for the manufacture of end-welded links only, whereas links welded at the side are stronger and better, and that the moving die on engaging the lower die receives a forward impulse which cannot be restrained perfectly and misshapes and weakens more or less the metal at the place of welding.

The object of my invention is to overcome the objections above noted and to cheapen and improve the welding of the links.

The invention consists both in an improved method of link-welding and in improved dies for that purpose, and it is illustrated in the accompanying drawings, in which—

Figure 1:
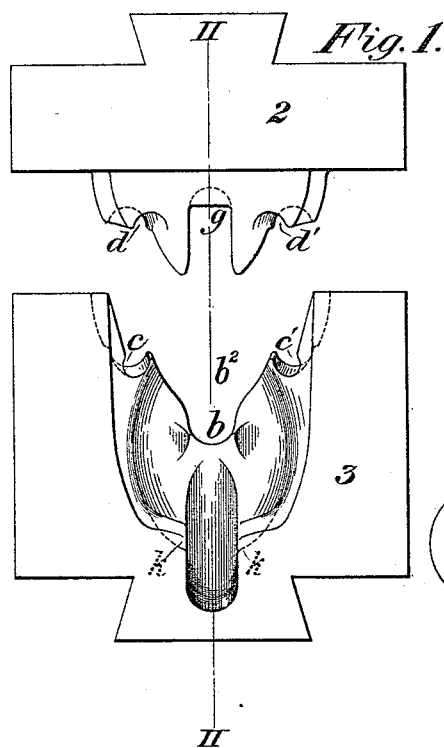
Figure 2:
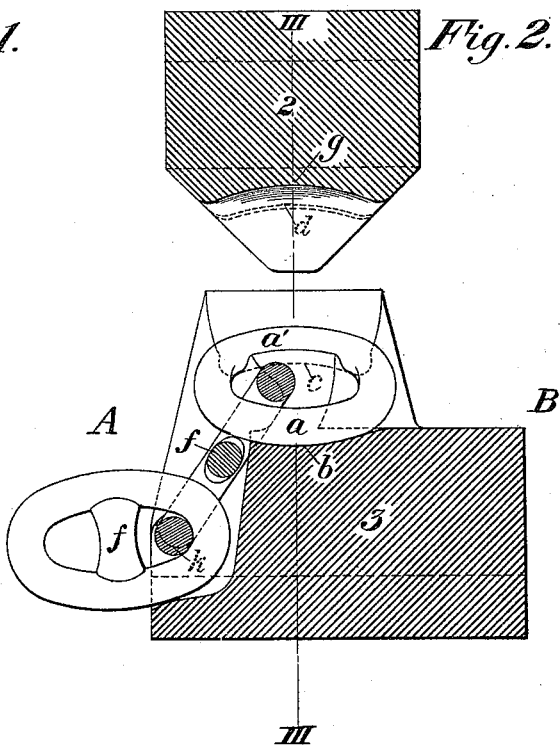
Figure 3:
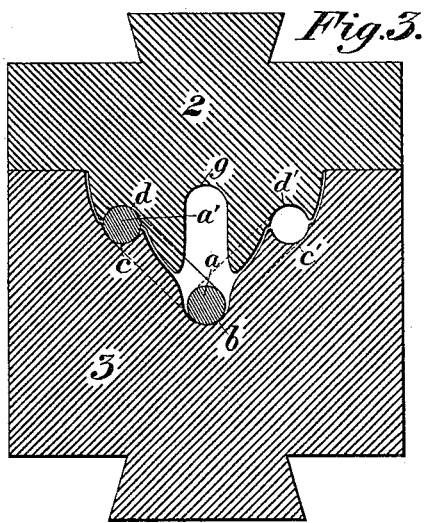
Figure 4:
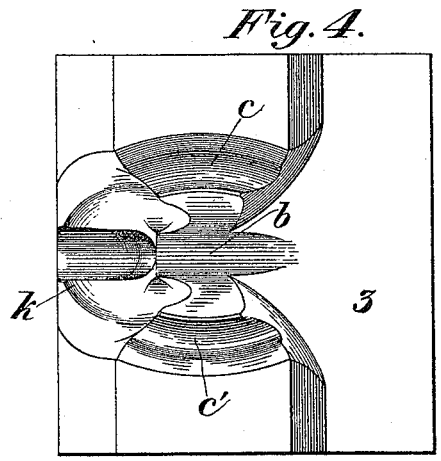
Figure 5:

Figure 1 is a rear elevation of my improved dies, showing the moving die raised. Fig. 2 is a vertical longitudinal section on the line II II of Fig. 1. Fig. 3 is a vertical cross-section on the line III III of Fig. 2, showing the dies closed. Fig. 4 is a plan view of the bottom die. Fig. 5 shows a link while it is open and before it has been welded. Fig. 6 shows in vertical cross-section dies of modified construction; and Fig. 7 is a vertical longitudinal section on the line VII VII of Fig. 6, showing the dies open.

Like symbols of reference indicate like parts in each.

In the drawings, 2 is the upper die, and 3 is the lower die. The lower die 3 is formed with a recess or cavity $b^2$, having at its base a central rest-groove $b$, (though this part may be omitted or modified in form and construction, as hereinafter explained,) and with two welding-grooves $c$ $c'$ situate, preferably, at a higher level and parallel to each other, and so related in distance to the rest-groove that when one side $a$ of the link is in the intermediate cavity $b^2$ the other side $a'$ may lie in one of the welding-grooves, as shown in Figs. 2 and 3, and that by turning the link, as indicated by the dotted lines in Fig. 3, the side $a'$ may be brought into the welding-groove $c'$ and may be turned freely back and forth from one welding-groove to the other.

In the drawings I show the grooves $c$ $c'$ separated from each other a distance equal to about ninety degrees of the arc of a circle whose radius is a line connecting the groove $b$ with one of the grooves $c$ $c'$. For reasons hereinafter explained this is the most desirable construction; but it is within the scope of my invention to construct the die so that these grooves shall be distant one hundred and eighty degrees of said circle, in which case the grooves $c$, $b$, and $c'$ would be on the same plane. It is desirable to construct the die with the groove $b$, because this groove affords a rest for the side $a$ of the link. In case it is not desired to use the groove the base of the die 3 is made flat or plain.

In Fig. 2 I show both sides A B of the bottom die open, and the workman in welding the links stands on the side B.

The moving die 2 is preferably of the form shown in Figs. 1, 2, and 3, having grooved portions $d$ $d'$, adapted to register with the grooves $c$ $c'$, as shown in Fig. 3, and it may have portions adapted to engage the lower die and to act as stops. The form of this die may be modified in various ways, such as will suggest themselves to the skilled mechanic by reading this specification.

In using the dies the workman first takes an open chain-link having its ends suitably scarfed, as shown in Fig. 5, heats the link at the scarfed ends, then gives it a blow either with the die or with a hammer, so as to bring the scarfed ends together, and having laid the link in the die, as shown in Fig. 3, so that one side $a$ shall lie in the intermediate cavity $b^2$ on the groove $b$ and the other side $a'$, which is to be welded, shall lie in the groove $c$ or $c'$, the moving die 2 is caused to descend and to strike against the side $a'$, as shown in Fig. 3, and as the die rises the workman with his tongs turns the link over laterally, so as to bring the side $a'$ into the groove $c'$, as shown by dotted lines, and after the link has received another blow turns it back into the groove $c$, and so turn the link alternately from one welding-groove to the other until by repeated blows of the upper die it has been sufficiently welded. When the dies are constructed as shown in Fig. 3, with the grooves $c$ $c'$ so placed that each turning of the link will turn its side $a'$ one-quarter around and that each blow of the hammer is exerted on the link at a point ninety degrees from the point of the last blow before, the consequence is that the tendency which each blow has for flattening out the metal is neutralized by the next blow, and I am enabled to preserve the link symmetrical in form at the weld. It is in this respect that this form of die is superior to the die in which the grooves $c$ $c'$ are so situate that in shifting the link laterally it shall turn more than ninety degrees. When the first link has been welded in this manner, the workman takes another unwelded link from the heating-furnace, threads it into the welded link, and places it on the bottom die in the manner shown in Fig. 2, while the already-welded link is suffered to rest in an upright or nearly upright position on a seat $k$ at the front of that die. When in this position, the link being welded can be turned back and forth on the die in the manner explained above without interference with the link or links already welded, so that instead of being obliged to move the whole chain in turning the link only the link itself need be handled and moved, and as the links of the chain which are welded in succession are not in the way of the workman the operation is rendered very much easier. When it is desired to insert between the sides of the link the strengthening stud or post commonly employed in making chains of large size, the link after being welded is set on its lateral edge in an upright position on the die 3, and the stud $f$ having been inserted a stroke of the hammer-die 2 will serve to close the sides of the link upon the stud. For this purpose I may form in the hammer-die a cavity $g$, the base of which forms the striking-surface. The same means may be employed when, instead of inserting a stud in the link, it is desired to force the sides of the link together for the purpose of shaping it by reducing its width.

In Figs. 6 and 7 I show a bottom die of modified form. This die possesses many intrinsic advantages, and while it embodies the same general principles of construction and mode of use as the dies shown in Figs. 1, 2, 3, and 4 it illustrates some of the various changes within the scope of my invention which may be made in the die by the skilled mechanic. In Fig. 6, instead of employing a central groove $b$, in which the side $a$ of the link rests, and locating the grooves $c$ $c'$ so that they shall be ninety degrees apart on a circle whose center corresponds to the groove $b$, the latter groove is omitted altogether and the cavity $b^2$ of the die, in which the side $a$ of the link rests, may be without bottom support, but its sides are preferably inclined so as to support the link laterally in proper position. The hammer-die corresponds in shape to the altered shape of the lower die. In welding the link the operation is the same as already described, except that in shifting it from one welding-groove to the other the link is supported by the tongs of the workman and is not only turned one-quarter but is shifted laterally somewhat, as shown by the dotted and full lines. This construction is somewhat advantageous in respect of the fact that more room for manipulating the work is afforded to the workman. A vertical slot or cavity $h$ is formed in the die, extending downwardly from the intermediate cavity $b^2$ for the reception of the link last welded, which during the welding of the next stands upright, while the preceding link may extend horizontally therefrom, as shown in the drawings. In shifting the link being welded from one side of the die to the other the next link also turns within the cavity $h$, as indicated in Fig. 6, but its action in this regard is very easy and causes no materially additional labor to the workman.

In order to use the dies for inserting the stud in the link, I draw the link after it is welded over upon the die-surface $j$, Fig. 7, and there subject it to the action of a corresponding portion of the moving die, which will close the sides of the link upon the stud.

Instead using the dies shown in the drawings for making chains, it is clear that they may be employed for making single links, which may be used for any purpose in the arts to which they may be adapted. Thus coupling-links and links of other sorts may be made by such dies with a great saving in cost and labor.

In making single links, as it is not necessary that the dies should be adapted to receive another link threaded into the link being welded, I may modify the dies in form. Thus instead of using grooves $cc'$ as the welding-grooves the groove $b$ may be used for this purpose, and the moving die changed correspondingly.

The advantages of my invention will be appreciated by those skilled in the art.

My improved dies are the means of reducing greatly the labor of link-welding and make cheaper and better links.

While I have shown the dies adapted especially to welding chain-links at the sides, I do not intend in the claims to exclude dies modified so as to be adapted to weld the links at the ends.

I claim—

1. In apparatus for welding links, the combination, with the moving die, of a bed-die having a vertical cavity adapted to receive the body of the link and to permit it to be turned laterally therein during the welding operation, substantially as and for the purposes described.

2. In apparatus for welding links, a die having two opposite welding grooves or shoulders adapted to receive the same side of a link when turned from one groove to the other, substantially as and for the purposes described.

3. In apparatus for welding links, a die having two opposite grooves or shoulders adapted to receive one side or end of an intermediate link which may be turned from one groove to the other, and an intermediate cavity or recess in the die for the other side or end of the link, substantially as and for the purposes described.

4. In apparatus for welding links, a die having two opposite welding grooves or shoulders adapted to receive one side or end of an intermediate link which may be turned from one groove to the other, and an intermediate cavity or recess in the die for the other side or end of the link, said grooves or shoulders being so situate relatively to each other that the link shall be turned about ninety degrees in shifting its side from one to the other, substantially as and for the purposes described.

5. A link-welding die having two oppositely-placed welding-cavities which correspond to one side of the link and provided with an interposed or intermediate pit which permits the partial rotation of the link to present opposite faces thereof to the welding-die, substantially as and for the purposes specified.

6. A welding-die having two parallel welding-cavities and an interposed link pit or cavity for retaining the preceding link, substantially as and for the purposes specified.

In testimony whereof I have hereunto set my hand this 1st day of August, A. D. 1890.

JAS. H. BAKER.

Witnesses:
THOMAS W. BAKEWELL,
W. B. CORWIN.